Dec. 20, 1966  P. R. SCOTT  3,292,647
TRANSPORTING WAX-BEARING OIL IN PIPELINES
Filed Aug. 27, 1965  2 Sheets-Sheet 1

INVENTOR:
PAUL RAY SCOTT
BY: *Oswald H. Milmore*
HIS ATTORNEY

INVENTOR:
PAUL RAY SCOTT
BY: *Oswald T. Wilmore*
HIS ATTORNEY

United States Patent Office 3,292,647
Patented Dec. 20, 1966

3,292,647
TRANSPORTING WAX-BEARING OIL IN PIPELINES
Paul R. Scott, Houston, Tex., assignor to Shell Oil Company, New York, N.Y., a corporation of Delaware
Filed Aug. 27, 1965, Ser. No. 483,113
10 Claims. (Cl. 137—1)

This is a continuation-in-part of my application Ser. No. 315,437, filed Oct. 11, 1963 now abandoned.

This invention pertains to a method and apparatus for pumping wax-bearing oil through pipelines. More particularly, it is concerned principally with reducing the effective viscosity and yield value of the oil to reduce friction losses and, thereby, to reduce pumping costs and pumping pressures for a given flow rate and increase the throughput capacity of pipelines for a given pressure. The invention further is directed to preventing the formation of a mass of oil and wax of high yield value upon shut-down of the pipeline. The invention is especially, but not exclusively, concerned with the transportation of highly viscous wax-bearing crude oil containing solid wax.

It is known that viscous liquids can be made to flow more easily through pipes by such expedients as lowering the viscosity by heating the liquid or adding soluble diluents or dispersing water in the liquid, or lubricating the pipe wall by forming a film of an immiscible liquid, particularly water or water which contains air dispersed therein (U.S. Patent No. 2,821,205, issued Jan. 28, 1958). Each of these expedients is subject to certain drawbacks, such as cost, contamination of the liquid, and the possibility of forming an emulsion of water in oil. Moreover, these expedients have not always been effective when applied to waxy crudes, wherein a wax structure builds up below certain temperatures.

It is an object of this invention to provide a method and means for facilitating the flow of oil containing solid wax particles, through a pipeline which avoids or greatly reduces the drawbacks noted. It is a specific object to reduce the yield value of a viscous wax-bearing oil thus reducing the pressure differential required to initiate flow in a length of pipeline filled with the liquid. It is a further object of the invention to decrease the flow resistance, thereby leading to reduced pumping costs.

In summary, according to the invention, the wax-containing oil to be flowed through a pipeline is subjected, at a temperature below that at which soild wax forms, preferably below its pour point, to shearing forces which break down the wax structure to form a fine dispersion, and a small quantity of gas is injected into the oil, either before, during or after the break down of the wax structure, to prevent re-growth of said structure. The amount of gas injected is preferably in excess of the solubility thereof in the oil, so as to form bubbles; however, smaller amounts of gas are also effective, provided the amount is close to saturation, specifically, such that the oil contains at least the quantity required to saturate the oil at atmospheric pressure. In this connection, it is noted that the oil within the pipeline is, during operation, maintained at a pressure considerably greater than one atmosphere and that the injection of gas is normally effected at a pressure above atmospheric.

As a consequence of this gas injection, the flow resistance is decreased, whereby pumping costs are reduced and/or the flow rate can be increased without an increase in pumping costs or increase in pumping pressures. Further, the danger of forming a large cohesive wax structure within the pipe upon shut-down of the pipeline is greatly reduced.

Two additional effects of the gas may be realized during start-up of the pipeline after a period of shut-down. After such a period, the effective viscosity of the oil rises because waxy oil behaves as a non-Newtonian liquid. The first effect is that the gas bubbles, being compressible, facilitate acceleration of the stationary body of oil in the pipeline. Large forces are required to bring a body of oil within a pipeline—often several miles in length between pumping stations—into motion if all parts are simultaneously accelerated from a non-flow condition. The bubbles throughout the oil produce a cushion effect, being compressed to permit different parts of the oil to come into motion in succession. Moreover, once flow is initiated, the effective viscosity of the oil is reduced due to shear and the oil becomes more mobile. Tests have shown that flowing reduced the yield point of such oil to one-hundredth of its initial value which prevailed under non-flowing conditions.

Further, it is often desirable to start the flow of oil after a period of quiescence by applying a series of pressure pulses to the oil instead of applying a steady pressure thereto, thereby to increase the effect of reducing the effective viscosity. To this end, the pipeline may be provided with a pulse generator, such as a reciprocating piston device that can be placed into flow communication with the pipeline. For the most effective transfer of energy from the device to the oil, the frequency of the pressure pulses advantageously conforms to the resonant frequency of the oil; this is subject to variation as progressively more oil is brought into motion. In this motion, the gas bubbles are alternately compressed and expanded.

Any gas may be used, and it is preferred to use one having only a limited solubility in the oil. The term "gas" is used herein to include vapor. A preferred gas is essentially a member of the class consisting of nitrogen, carbon dioxide, flue gas, hydrocarbons having less than three carbon atoms, such as natural gas, and mixtures of any of these gases. The flue gas may be obtained by burning a part of the oil in the pipeline.

The invention is founded on the discovery that the yield value of petroleum containing solid wax particles is lowered by mechanical working that breaks down the wax structure, and that the injection of the gas prevents or inhibits re-growth of the wax structure, whereby the yield value of the oil remains low. The gas forms an association with the individual wax crystals which prevents or inhibits their combination with other crystals that would form within the oil a strong wax structure; such a structure, if formed, would resist flow. Best results are obtained when gas bubbles are present.

The exact mechanism of the association of the gas with the wax particles is not known. It is believed that the gas, at least in part, collects on the surfaces of the wax particles—especially the larger particles—to form gas films or envelopes on or around the particles, thereby forming a film or barrier layer which isolates the particles from one another and prevents them from adhering to new wax particles that may be precipitated from solution in the oil. Such gas films or envelopes further tend to prevent the enclosed wax particles from going into solution in the oil, from which the wax could precipitate to form new particles which would form a strong wax structure within the oil. The presence of such a strong structure increases the flow resistance of the oil and the pressures required to maintain and initiate flow. Initiation of flow through a pipeline which has been shut down often requires extremely high pressures after a strong wax structure has formed. However, I do not restrict myself to any theory regarding the nature of the association of the gas with the wax particles, and it is possible that the formation of a true gas phase which encloses the wax particles does not or does not always occur as when the amount of gas injected is not in excess of its solubility in the oil.

The gas bubbles formed when the amount of injected gas exceeds its solubility act to reduce the flow resistance of the oil. This is contrary to the known phenomenon that the addition of a third, immiscible fluid to a solid-liquid system increases the yield value of that system. Thus, Grove, Wise, Marsh and Gray in the article "Viscosity of Fire-Fighting Foam," Industrial and Engineering Chemistry, vol. 43, pp. 1120–1122 (May 1951) reported a large increase in the viscosity of the liquid due to dispersal of gas therein.

The minimum amount of gas to be injected is determined by the requirement previously stated that the oil must be saturated at atmospheric pressure. The maximum is usually 8% by volume of undissolved gas, but this value may be exceeded as is discussed hereinafter. The amount may exceed solubility in the oil at the highest operating pressure of the pipeline (just downstream of the line pump) so that a small amount, usually between 0.1–5% by volume of undissolved gas, occurs in the oil in the form of small bubbles, at the pump discharge. In either case, the volume of undissolved gas is usually between 0.1 to 8% by volume at the suction side of the next pump. It was found that well-dispersed gas in limited amounts tends to assume a characteristic degree of dispersion and is not subject to coalescence while the oil flows through the pipeline. The gas bubbles often tend to concentrate at an annular sheath situated radially outwardly from the major portion of the oil stream, thereby often producing a low-shear zone and promoting plug flow of the oil.

The maximum amount of gas to be injected is selected on the basis of the following:

When a series of line pumps are used at intervals along the pipeline, the pressure falls between pumping stations and the quantity of undissolved gas as well as its volume increases, reaching a maximum at the intake to the next pump. This may cause pump cavitation if the volume of the gas bubbles and their sizes are excessive, and for this reason it is preferred to avoid more than 8% by volume of gas bubbles at the lowest line pressure unless special means are used to remove free gas from the oil. The stated volume at the low-pressure section, of course, corresponds to the presence of a far smaller volume of free gas, or in total dissolution of the gas, at the discharge side of each pump where the highest pressure usually prevails and at portions of the pipeline downstream therefrom. In the case of short pipelines, having only one pump, this limitation does not apply, and in this case the stated range of between 0.1 and 8% by volume of the undissolved gas may be applied to the part of the pipeline whereat the pressure is half of the pump discharge pressure.

When the pipeline is shut down and its pressure reduced below operating pressure, the volume of gas bubbles increases, e.g., to between 1 and 10% or more by volume.

To disperse the gas as fine bubbles in petroleum which contains solid wax, as well as to disrupt the wax even when no gas bubbles are formed, it is usually necessary to employ high shear rates or a high degree of turbulence. Dispersion of gas is effected in a zone which may be at a charging station of the pipeline or along the pipeline. Gas may also be dispersed as fine bubbles by dissolving the gas in the petroleum at a high pressure and then allowing the bubbles to form as the pressure decreases below the bubble point pressure of the mixture, resulting in nucleation of gas bubbles at separated points. It was found that subjecting the waxy oil to shear rates of 1500 sec.$^{-1}$ or higher, e.g., 2,000 to 2,500 sec.$^{-1}$ for very short times, e.g., 2 to 4 seconds, reduced the effective viscosity and degraded the wax structure satisfactorily.

When a viscous petroleum liquid having a high wax content is transported through a pipeline, it is in some cases advantageous, before injecting and dispersing the gas, to lower the temperature of the said liquid to approximately the average temperature which prevails in the liquid while in the pipeline or to a lower temperature. This will avoid the precipitation of fresh wax particles and the consequent building-up of a strong wax structure if the flow of the liquid in the pipeline is interrupted and the liquid remains stagnant therein for an extended period of time.

Moreover, it is desirable to avoid significant changes in the temperature of the wax-containing petroleum stream after dispersal of the gas, to minimize formation of new wax crystals by precipitation. For example, when the stream at ambient temperature flows through a pump, energy is added to the liquid, leading to a rise in temperature; subsequent cooling of the stream to ambient temperature causes wax precipitation. For this reason, it is desirable to cool such a liquid sufficiently below the pipeline temperature prior to pumping to allow for this temperature rise and achieve a liquid discharge temperature near or below the average pipeline temperature. Hence, only small changes in oil temperature usually occur in flowing through the pipeline.

The invention is not limited to oils of any specified pour point; this usually is between 0° to 140° F. However, it is of increasing value for oils of higher pour points, e.g., those with pour points above 40° F., especially above the ambient pipeline temperature.

It is desirable to avoid a build-up in pressure within the pipeline upon shut-down, to ensure the presence of gas bubbles in the oil. Thus, when the pumps are not provided with by-pass pipes that can draw-off a part of the oil, a bleed-off arrangement may be provided in at least one part of the pipeline. This may, for example, include a pressure-responsive valve in a draw-off line that bleeds-off oil into a reservoir until the pipeline pressure falls to a desirable level at which gas bubbles are present.

The invention will be further described with reference to the accompanying drawing forming a part of this specification and showing a preferred embodiment, wherein.

Figure 1:
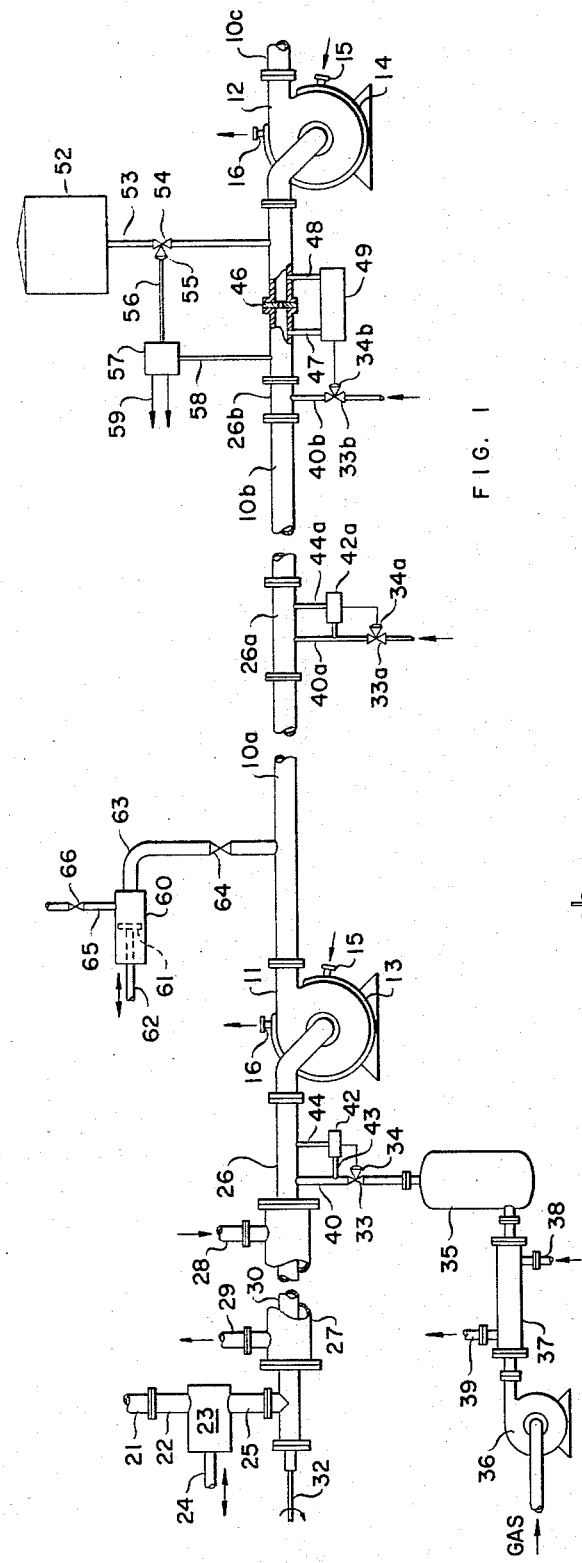
FIGURE 1 is a diagrammatic elevation view of a part of a pipeline to which the invention is applied.

Referring to FIGURE 1, there is shown a part of a pipeline comprising sections 10a, 10b, 10c and a plurality of pump stations 11 and 12, which may be located at predetermined intervals along the pipeline. The pumps are usually centrifugal pumps, driven by suitable electrical motors, not shown. When temperature control of the waxy petroleum is used, these pumps may be provided with jackets 13 or 14, to which a coolant is admitted at 15 and from which it is discharged at 16.

Figure 2:
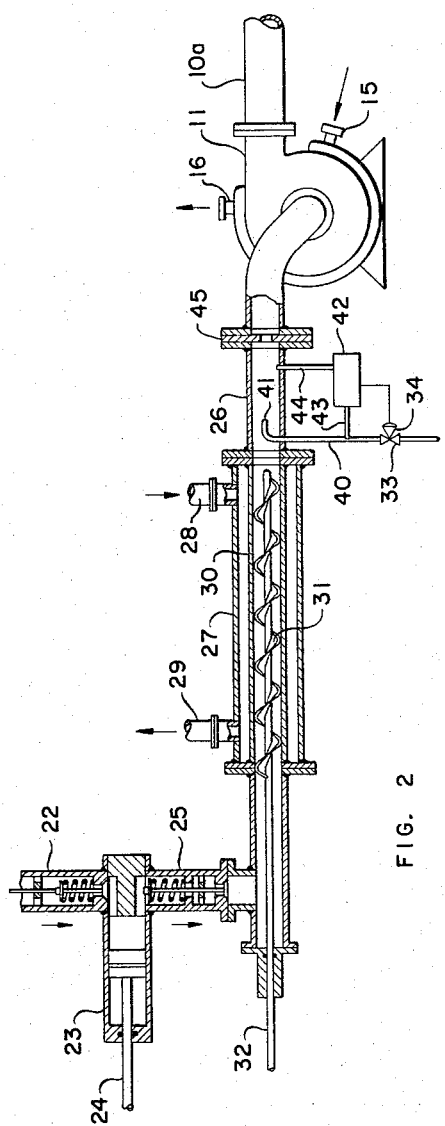
FIGURE 2 is an enlarged longitudinal sectional view of parts of FIGURE 1.

The waxy oil is charged to the pipeline through an entrance pipe 21 to the suction side 22 of a feed pump 23, represented as a reciprocating pump having a drive member 24, although the invention is not restricted to this form of pump. The discharge side 25 of the feed pump 23 is connected to a gas injection unit 26, optionally, but often, through a heat exchanger 27. The exchanger 27 includes inlet and outlet conduits 28 and 29 for the circulation of a thermal liquid, through an annular chamber surrounding the inner pipe 30 through which the principal stream flows. It may be further provided with means for scraping the pipe 30, such as an auger 31 having a drive shaft 32, as shown in FIGURE 2.

This auger has a blade of helical shape and is rotated within the pipe 30 to aid the flow of the waxy oil and to keep the inner wall of the pipe clean for better heat exchange.

Optionally, there may be one or more additional gas injection units 26a and 26b, situated intermediate to pumping stations or at downstream pumping stations. These injection units being of like construction, only the unit 26 will be described. As appears further in FIGURE 2, each gas injection unit is provided with a flow-control valve 33 and valve operator 34 therefor, and a source for gas, such as a pressure vessel 35, to which gas is supplied by a compressor 36, optionally through a heat exchanger 37. The exchanger 37 has inlet and outlet conduits 38 and 39 for the flow of a thermal liquid, usually a coolant, for bringing the gas to about the temperature of the liquid flowing through the injection unit. Optionally, the gas may be cooled to a temperature sufficiently low to cause condensation and the resulting liquid is then stored in pressure vessel 35. The heat exchanger 37 may be omitted, especially if the gas supplied is sufficiently cool and/or the temperature of the crude is at or below the average pipeline temperature. The valve 33 receives gas from the vessel 35 and supplies it to a conduit 40 and sparging nozzle 41 for injection into the central region of the oil. It may be noted that the invention is not restricted to this specific arrangement for injecting the gas and other arrangements may be used, for example slits or ports in the pipe, as shown in the aforesaid U.S. Patent No. 2,821,205. The valve operator 34 is actuated by a flow controller 42 having suitable connections for measuring the flow rate of gas through the valve and maintaining it at a constant predetermined rate. For example, these connections may measure the pressure drop across the sparging nozzle 41 by means of pressure taps 43 and 44 connected respectively to the conduit 40 and the interior of the unit 26. Suitable means for inducing high shear and/or turbulence and breaking-up wax structures are provided in each unit 26. In the embodiment shown, this takes the form of an orifice plate 45 mounted at the outlet end. However, the gas can also be dispersed solely by the turbulence of the pump 11.

The gas injection rate can be controlled in accordance with a flow meter, such as an orifice meter shown at 46, connected by pressure taps 47 and 48 to a controller 49 which corresponds to the controller 42 and emits a signal to a valve operator 34b. This operator controls the valve 33b in the gas flow line 40b to the unit 26b.

The system may optionally include means for reducing the pressure within the pipeline to a desired level in the event of a shut-down. This means may include a small reservoir 52 connected to the downstream end of the pipeline by a pipe 53 through a normally closed shut-off valve 54. The valve has an operator 55 which is actuated via a line 56 from a controller 57 which senses the pressure within the pipeline through a tube 58. The controller further may have an electrical control circuit 59.

When the pipeline is shut down the pressure drop through the pipe line disappears and the pressure at the downstream end may rise thereby causing the controller 57 to open the valve 54. This lowers the pressure within the pipeline by bleeding off a part of the oil into the reservoir 52 and causes gas dissolved in the oil to escape to form bubbles and counteracts the tendency of bubbles to dissolve due to the rise in pressure. The controller 57 is adjusted to shut the valve 54 when the pressure has fallen to the desired level. If desired, circuit 59 may be connected to an over-riding control to prevent operation of the controller 57 unless the circuit is energized. It will be understood that the pipeline may be provided with suitable or conventional valves and controls, not shown, at the pumps for isolating them upon shut-down and for maintaining constant suction pressure on intermediate pumps.

It is evident that when the pressure can be reduced by discharge through the downstream line pump 12 or through a by-pass line around this pump, the parts 52–59 are not needed.

To start up the line after a shut-down, it is at times desirable to apply a pulsating pressure rather than a steady pressure. Such a varying pressure may be applied by a pulse generator, such as a cylinder 60 containing a reciprocable piston 61 that has its piston rod 62 connected to a suitable driving power device. The cylinder is connected to the pipeline via a branch pipe 63 having a normally closed valve 64 and is further connected to a reservoir of a Newtonian liquid by a pipe 65 normally closed by a valve 66. To apply pulses, the valve 66 is opened, the cylinder is filled with Newtonian liquid; the valve 66 is then closed and the valve 64 opened. Reciprocating the piston 61 creates pressure pulses that cause small movements of the waxy oil in the pipeline. This movement is facilitated by the presence of gas bubbles in the oil and works the wax to reduce the effective viscosity of the waxy oil, which acts as a non-Newtonian liquid. The effect of working on such oil will be described hereinafter in Example I. When the effective viscosity of the oil has been reduced to the point where the pumps can effect flow, they are placed into operation and the valve 64 is closed.

In normal operation the waxy oil is charged through the inlet 21 by the pump 23 to the heat exchange 27, wherein it is cooled, e.g., to a temperature slightly lower than that prevailing within the main pipeline 10a, or than the average temperature of the ground adjacent to the pipeline and below the pour point of the oil.

Gas which may be brought to the temperature of the cooled stream by the exchanger 37 (or to a lower temperature) is injected into the stream within the injection unit 26 from the nozzle 41 at a predetermined rate, which can be adjusted manually, e.g., in accordance with the pumping rate, and is controlled by the valve 33, to inject gas in amount which would saturate the oil at least at atmospheric pressure and the prevailing temperature and, preferably, sufficient to introduce 0.1–8% by volume of undissolved gas into the oil. For example, natural gas is injected in amount so that 2–5% by volume remains undissolved. The injection rate may, if desired, be controlled directly according to the oil flow rate, as by controlling from a controller 42 or 49. The dispersion is subjected to high shear in flowing through the orifice plate 45. This shear, and that due to the action of the centrifugal pump 11, disrupt the wax structure and disperse any undissolved gas throughout the oil as fine bubbles. Because energy is added to the liquid by the pump 11, the temperature would rise if heat were not abstracted, resulting in dissolving of some of the wax and making the subsequent precipitation of wax upon cooling within the pipeline more likely. To counteract this, the stream is advantageously cooled by flowing coolant through the pump jacket via conduits 15 and 16.

Some of the dispersed gas bubbles are believed to migrate to an annular zone near the pipe wall where the gas concentration is higher than in the central part. This zone has a low shear strength and provides a slippage zone which permits the viscous oil contained therein to move through the pipe with reduced drag.

Additional gas may be injected in the injection units 26a and/or 26b, principally to replenish gas which may coalesce to form bubbles and to rise to the upper part of the stream when long pipelines are used. In practice, a smaller amount of gas is injected in these units than in the initial unit 26. In many instances, it is not necessary to inject additional gas at downstream points, but merely to redisperse the gas that may have separated, using for this purpose the orifice plates 45 in the injection units and/or at the main centrifugal pumps. This also subjects the wax to shear and disrupts such agglomerates and structures as may have formed.

*Example I*

Figure 3:
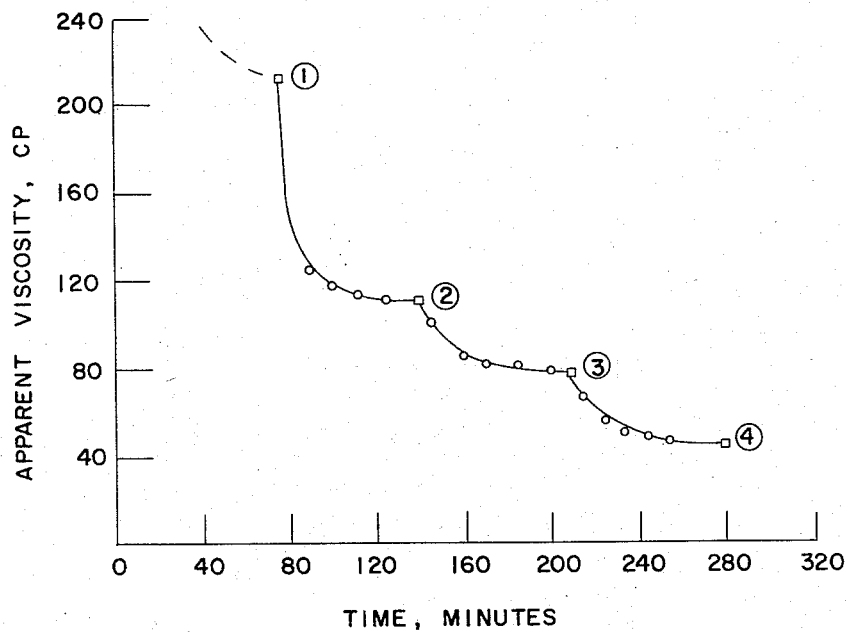
FIGURE 3 is a graph showing the properties of a waxy crude.

An indication of the improvement attainable according to the invention is given by the following example. A waxy petroleum had an initial viscosity of about 100,000 centipoises, which was reduced by being subjected to shear in a manner which varied both with the intensity and the length of time that it was subjected to shear, this behavior being typical of many such oils. Its viscosity can, therefore, be described best by a graph. This is shown in FIGURE 3, wherein the apparent viscosity in centipoises is plotted as ordinates and the time in minutes as abscissae. In obtaining these data, the oil was subjected to four successive shear conditions without intervening interruption, each for an extended period, at the shear rates as shown in Table I, and the apparent viscosities were measured in a Fann viscometer:

TABLE I

| No. | Shear Rate, Sec.⁻¹ | Apparent Viscosity, Centipoises |
|---|---|---|
| 1 | 80 | 213 |
| 2 | 160 | 110 |
| 3 | 240 | 77 |
| 4 | 480 | 46 |

The viscosity shown in FIGURE 3 is seen to approach equilibrium for each shear rate and the end of each period, indicated by the numbers 1, 2, 3 and 4, and that each increase in shear rate resulted in a lower apparent viscosity.

The above-described petroleum was subjected to a high rate of shear for a very short time and the viscosity was thereby reduced greatly to a low value. This oil was introduced immediately into a small pipeline (0.305 in I.D.) and flow measurements, including the pressure drop, were made. Two comparative runs were made, the first at a pressure of 105 p.s.i.g. and a temperature of 84° F. and the second at a pressure of 48 p.s.i.g. and a temperature of 100° F. Solid wax was present at both temperatures. In each comparison, the oil was first run through the pipe without any gas and then with nitrogen gas, which was injected in an amount to leave 5% by volume undissolved in the form of fine bubbles. The gas caused a further decrease in the effective viscosity and, hence, a lowering of the pressure drop for the same flow rate. The improvements are shown in Table II:

TABLE II
[LOWERING OF PRESSURE DROP BY THE DISPERSAL OF GAS]

| Comparison | Temp., °F. | Decrease in Pressure Drop, percent |
|---|---|---|
| 1 | 84 | 14 |
| 2 | 100 | 20 |

The foregoing shows the combined effect of dissolved and free gas.

*Example II*

The separate effect of dissolved gas in waxy crude is shown from the following data obtained on a waxy crude having an A.P.I. gravity at 60° F. of 30.2 and a pour point +90° F. The original apparent viscosity was about 20,000 centipoises which was reduced to 92 centipoises by flow through a pump and a 0.43 inch I.D. pipe. The viscosity was further reduced by injecting varying amounts of ethane, in amounts such that all was dissolved. In all runs the temperature of the crude was held constant at 82° F., and the crude was flowed through 0.43 inch I.D. pipe at a flow velocity of 3.0 ft./sec. The measurements of apparent viscosity in centipoises, flow resistance and amount of dissolved ethane in standard cubic feet per barrel of crude, for five runs, are shown in columns 2-4 of Table III wherein column 5 shows the computed percent reduction in flow resistance compared to run 1, wherein no gas was added:

TABLE III

| Run | Apparent Viscosity, cp. | Flow Resistance, p.s.i./ft. | Ethane Dissolved, s.c.f./bbl. | Reduction of Flow Resistance, percent |
|---|---|---|---|---|
| 1 | 92 | 1.20 | None | |
| 2 | 67 | 0.74 | 43 | 38 |
| 3 | 63 | 0.70 | 58 | 42 |
| 4 | 57 | 0.63 | 77 | 47 |
| 5 | 37 | 0.41 | 138 | 66 |

It is evident that a reduction in flow resistance is realized although no free bubbles are present.

*Example III*

The separate effect of free bubbles of gas in waxy crude is shown from the following data obtained on a waxy crude having an A.P.I. gravity at 60° F. of 39.6 and a pour point +105° F. and containing nitrogen. In each of three comparisons, the same amount of nitrogen per volume of crude was present but the pressure was varied so that all the gas was dissolved in the first run and bubbles were present in the other; in both runs the crude was flowed at the same velocity through a 1.01 inch I.D. diameter pipeline at a temperature from 84–86° F. Table IV shows the data in columns 2–5 and the computed reduction in flow resistance in column 6:

*Table IV*

| Comparison | Flow Vel., ft./sec. | Apparent Viscosity, cp. | Flow Resistance, p.s.i./ft. | Free N₂ as Bubbles, percent by vol. | Reduction of Flow Resistance, percent |
|---|---|---|---|---|---|
| 1 | 4.8 | 41 | 0.13 | 0 | |
| | | 35 | 0.11 | 6 to 10 | 15 |
| 2 | 6.3 | 56 | 0.23 | 0 | |
| | | 41 | 0.17 | 2 to 6 | 24 |
| 3 | 8.5 | 34 | 0.19 | 0 | |
| | | 31 | 0.17 | 1 to 3 | 11 |

The beneficial effect of undissolved gas bubbles in varying amounts and at various flow rates is evident.

While the invention has been described as a means for facilitating flow in a pipeline, it is not so limited. It has broader value as simply a means for treating waxy crude oils for subsequent handling. As an example, an oil containing wax can be subjected, at or below the temperature at which solid wax forms, to shearing forces which break the wax structure and to gas injections which inhibit regrowth of the wax structure for subsequent storage.

I claim as my invention:

1. The method of treating a crude oil containing undissolved wax at operating temperatures for convenient handling which comprises the steps of:
   (a) subjecting a stream of the oil at a temperature at or below that at which solid wax occurs to shearing forces which breaks down the wax structure and forms a dispersion of smaller wax particles in the oil;
   (b) injecting into said oil a gas in amount at least sufficient to saturate the oil at the operating temperature and at least atmospheric pressure to inhibit formation of a wax structure in the oil; and
   (c) flowing the resulting composition to a point for subsequent handling.

2. The method of transporting through a pipeline an oil which contains an undissolved wax at ambient pipeline temperature which comprises the step of:
   (a) contitnuously subjecting a stream of said oil at a temperature at or below that at which solid wax occurs to shearing forces which breaks down the wax structure and forms a dispersion of smaller wax particles in the oil;

(b) injecting into said oil gas in amount at least sufficient to saturate the oil at the said temperature and at least atmospheric pressure to inhibit formation of a wax structure in the oil; and (c) flowing the resulting composition through said pipeline.

3. Method as defined in claim 2 wherein the oil and wax are subjected to shear after injection of said gas.

4. Method as defined in claim 2 wherein said injected gas is in excess of the solubility thereof at the highest pressure within the pipeline and at the temperature prevailing therein, such as to disperse between 0.1 and 8% by volume of the resulting composition as an undissolved gas.

5. Method as defined in claim 2 wherein said amount of gas is less than that which is soluble in the oil at the highest pressure within the pipeline and at the temperature prevailing therein and sufficient to produce between 0.1 and 8% by volume of undissolved gas bubbles in the oil at a lower pressure within the pipeline.

6. Method as defined in claim 2 wherein the temperature at which said oil and wax are subjected to shear is at least as low as the average temperature at which said oil flows through said pipeline subsequently to the injection of gas.

7. The method defined in claim 6, wherein said dispersion of wax particles in oil is passed through a pump after the injection of gas for driving the oil through the pipeline and heat is removed from the oil substantially during the pumping to counteract heating due to addition of energy by the pumping step.

8. Method as defined in claim 2 wherein said gas is selected from the group consisting of nitrogen, carbon dioxide, flue gas, hydrocarbons having less than three carbon atoms, and mixtures thereof.

9. A method for providing starting-up procedure for pipelines transporting an oil containing undissolved wax at ambient pipeline temperature which comprises the steps of:

(a) continuously subjecting a stream of said oil at a temperature at or below that at which solid wax occurs to shearing forces which breaks down the wax structure and forms a dispersion of smaller wax particles in the oil;

(b) injecting into said oil gas in amount sufficient to produce undissolved gas bubbles at the temperature and pressure encountered upon shut-down of the pipeline;

(c) flowing the resulting composition through said pipeline until flow is interrupted by a shut-down;

(d) after a period of quiescence, starting flow of the oil at a temperature at which solid wax is present by applying a series of pressure pulses to the oil, thereby oscillating the oil to decrease its effective viscosity; and (e) thereafter resuming flow of the oil through the pipeline.

10. The method of transporting through a pipeline a viscous petroleum crude oil which contains wax at a temperature at which undissolved wax is present, which comprises the steps of:

(a) continuously subjecting a stream of said crude oil at a temperature below the pour point of the oil to shearing forces to break down the wax structure and form a dispersion of smaller wax particles in the oil;

(b) subjecting into said crude oil gas in amount between 0.1 and 8% by volume in excess of the solubility of the gas in the oil at the highest pressure prevailing within the pipeline and thereby associating the said gas with the wax particles and inhibiting formation of a wax structure in the oil; and (c) pumping the resulting dispersion through said pipeline.

References Cited by the Examiner

UNITED STATES PATENTS

| | | | |
|---|---|---|---|
| 1,007,788 | 11/1911 | Mills | 137—13 |
| 1,454,485 | 5/1923 | Persch | 137—13 |
| 3,143,124 | 8/1964 | Todd | 137—13 |

ALAN COHAN, *Primary Examiner.*